Feb. 19, 1957 — J. O. GEISSBUHLER ET AL — 2,782,297
LIGHT PROJECTION DEVICE
Filed June 29, 1953 — 2 Sheets-Sheet 1
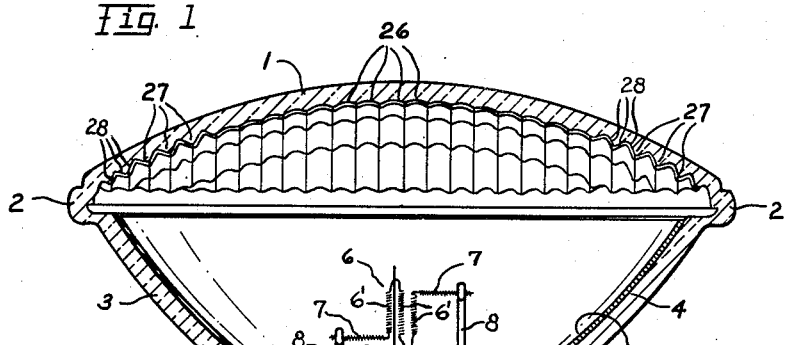
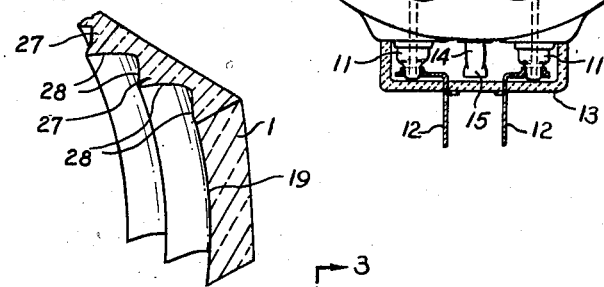
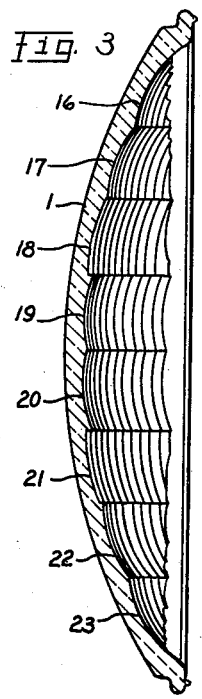
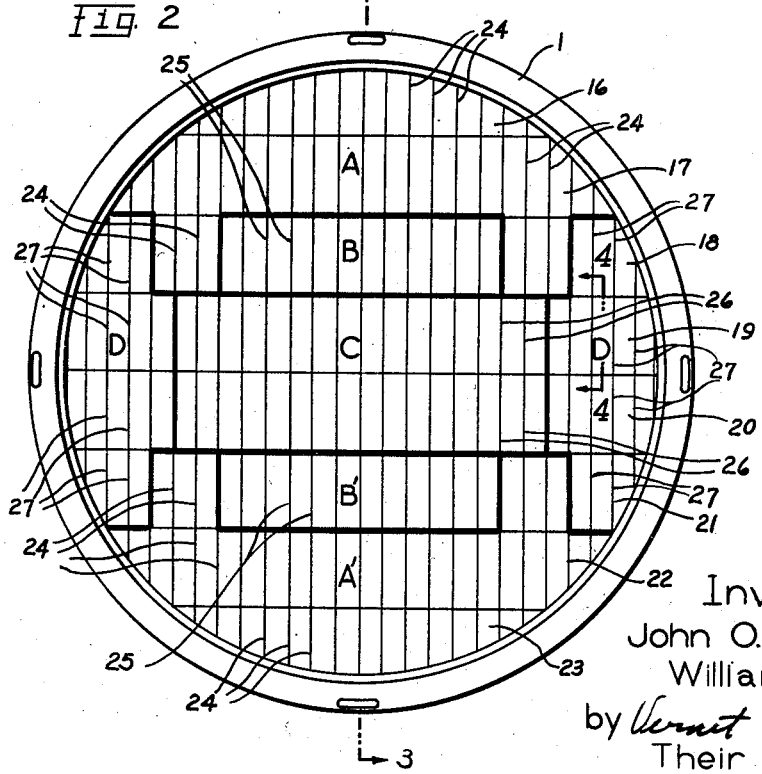
Inventors:
John O. Geissbuhler,
William W. Kirk, Jr.,
by Vernet C. Kauffman
Their Attorney Feb. 19, 1957   J. O. GEISSBUHLER ET AL   2,782,297
LIGHT PROJECTION DEVICE Filed June 29, 1953                         2 Sheets-Sheet 2

Inventors:
John O. Geissbuhler,
William W. Kirk, Jr.
by *Vernet C. Kauffman*
Their Attorney

United States Patent Office 2,782,297
Patented Feb. 19, 1957

2,782,297

LIGHT PROJECTION DEVICE

John O. Geissbuhler, South Euclid, and William W. Kirk, Jr., Lyndhurst, Ohio, assignors to General Electric Company, a corporation of New York; patent dedicated to the Public insofar as it relates to lamps and lamp parts to the extent stated in document recorded in the United States Patent Office, January 4, 1954, Liber U–238, page 394

Application June 29, 1953, Serial No. 364,724

11 Claims. (Cl. 240—41.3)

Our invention relates, in general, to light projection devices and to light-directing elements or lenses therefor.

For certain lighting service applications it is desirable to provide a light projection device which will project a concentrated light beam having a rectangular-shaped beam pattern characterized by a substantially uniform light intensity throughout the entire rectangular area of the beam pattern and a sharp cut-off at the boundaries of the rectangle. For example, for certain airport approach illumination purposes a lamp is required which will project a light beam having a horizontally extending rectangular beam pattern possessing a horizontal spread of, for instance, around 30 degrees and a vertical spread of around 12 degrees, with a light intensity throughout the entire area of the rectangular beam pattern of the order of from 20,000 to 25,000 candlepower so as to produce a smooth beam with no apparent hot spots in the center region thereof.

It is an object of our invention, therefore, to provide a light projection device which will project a smooth rectangular patterned light beam characterized by a substantially uniform light intensity throughout the entire cross-sectional area of the rectangular beam pattern and by a sharp cut-off at the boundaries of the rectangle.

Another object of our invention is to provide a lens for a light projection device which will redirect light rays from the reflector of the projection device into a light beam of the above-described character.

According to one aspect of the invention, the lens or other light-directing member of the light projection device is provided with a series of horizontal primary flutes of relatively large size for vertically spreading the light rays, and the portions of the member other than at the opposite sides thereof are provided with a series of relatively small vertically extending secondary flutes superimposed on the horizontal primary flutes, the secondary flutes being of relatively wide horizontal light spread but of lesser spread within those primary flutes at the central zone of the member. In addition, the opposite side portions of the member are provided with relatively small vertically extending left and right bending prisms superimposed on the portions of the primary flutes within such side portions for refracting the light rays from the said side portions of the member approximately one-half to each side extremity of the projected beam. According to a further aspect of the invention, the faces of the vertically extending prisms at the opposite sides of the lens or other light-directing member are provided with vertically extending flutes of relatively narrow light spread for horizontally spreading the light rays passing through the prisms so as to smooth out the portions of the light beam produced by the side portions of the lens.

Further objects and advantages of our invention will appear from the following detailed description of a species thereof and from the accompanying drawing.

In the drawing, Fig. 1 is a plan view, partly in section, of a light projection device comprising our invention;

Fig. 2 is a rear elevation of the lens of the light projection device shown in Fig. 1;

Fig. 3 is a vertical section on the line 3—3 of Fig. 2;

Fig. 4 is a fragmentary perspective sectional view of a portion of the lens taken on the line 4—4 of Fig. 2 and showing in detail the construction of the prisms at the opposite sides of the lens;

Figure 5:
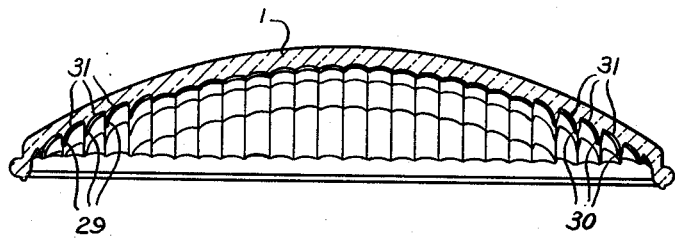
Fig. 5 is a horizontal section similar to Fig. 1 of a modified form of lens according to the invention.

In the accompanying drawing, the invention is there shown as applied to a self-contained reflector lamp of the "sealed beam" type described and claimed in U. S. Patent 2,148,314, D. K. Wright, issued February 21, 1939, and assigned to the assignee of the present invention. As shown in Fig. 1, the said lamp comprises a preformed glass lens section 1 constructed in accordance with the invention and fusion-sealed at its periphery, as indicated at 2, to the rim of a preformed concave glass reflector section 3 to form therewith the envelope of the lamp. The concave inner surface 4 of the reflector section 3 is of approximately paraboloidal shape and is covered with a coating 5 of a suitable metal, such as aluminum for instance, to form a reflecting surface. A concentrated filament or light source 6 is mounted within the lamp envelope at approximately the focal point of the reflecting surface 5. For the particular purposes of the invention, the filament 6 is of the monoplane type having three side-by-side coiled or coiled-coil segments 6' of tungsten wire extending approximately parallel to one another, the filament being mounted in the reflector section 3 with its individual segments 6' disposed in a horizontal plane and extending parallel to or in the general direction of the reflector axis and with its central segment approximately centered at the focal point of the reflector member. The filament 6 is provided at its opposite ends with end portions 7 which are electrically connected to lead-in conductors or wires 8 to support the filament in place. The filament 6 is additionally supported at points intermediate its length, i. e., at the bight portions thereof joining the individual filament segments 6', by supplementary support wires 9 anchored in an insulative bridge member 10 fastened across the lead-in conductors 8. The said conductors 8 extend through openings (not shown) in the wall of the reflector section 3 at the rear thereof and are secured at their outer ends, as by brazing for instance, to metal thimbles or ferrules 11 fusion-sealed at their rims to the exterior of the reflector section 3 around the said openings. Metal contact or terminal prongs 12, preferably of the blade type, are suitably secured, as by soldering, to the closed ends of the metal thimbles 11. An insulating cap 13 is fitted over the prongs 12 and suitably held in place against the rear face of the reflector member 3 (as by bent out tongues on the prongs) so as to enclose the thimbles 11 and thus afford electrical protection therefrom. The lamp envelope is exhausted and, if desired, filled with a suitable inert gas such as argon, nitrogen, or mixtures thereof, through an exhaust tubulation 14 at the apex of the reflector section 3, which tubulation is afterwards tipped-off, as indicated at 15, to hermetically seal the lamp envelope.

A light projection device such as described above but having a clear cover glass section 1, i. e., one without any light-modifying elements thereon, will project a light beam having a beam pattern of horizontally elongated shape with three horizontally separated hot spots, to wit, a central hot spot of relatively high intensity and a somewhat less intense hot spot at each side of the central hot spot. A considerable portion of the light which forms the central hot spot of this beam comes from those areas D of the lens located at the opposite sides thereof. In accordance with the invention we have found that by refracting or shifting the light rays passing through these side areas D of the lens approximately one-half to each side extremity of the beam, the intensity of the light remaining in the central portion of the beam is reduced to a level of the order of that at the aforementioned side hot spots of the beam, while the side extremities of the beam are vertically heightened to more or less correspond to the height of the beam at the center thereof and, in addition, are increased in intensity so as to more or less correspond to that of the rest or inner portion of the beam. The net result, therefore, is a rectangular-shaped beam pattern which, when smoothed out by the provision of suitable light spreading flutes on the lens, is of approximately uniform intensity throughout both its lateral and vertical extent, with a very sharp cut-off or drop in light intensity at the boundaries of the rectangle.

To this end, the lens is divided on its inner or back face into a series (eight in the particular case shown) of horizontally extending primary flutes 16–23 for vertically spreading the light rays from the lamp. These horizontal flutes 16–23 are preferably of concave shape as shown in Fig. 3 and are of relatively large size. Thus, in the particular case illustrated wherein the lens 1 is of the order of around 7 inches in outside diameter, the primary flutes 16–23 have a vertical height of around 13/16 inch or so and are curved to a radius of the order of 1¼ to 1¾ inches or thereabouts. The two uppermost primary flutes 16, 17 and the two lowermost primary flutes 22, 23 form the top and bottom zones, respectively, of the lens while the two center primary flutes 19, 20 form the central zone of the lens. The primary flutes in these zones which are indicated as A, A' and C in Fig. 2, are designed to provide a vertical light spread of the order of 15 degrees. The flutes 18 and 21, which are located intermediate the flutes 17, 19 and 20, 22, respectively, form the upper intermediate and lower intermediate zones of the lens. The central portions of the intermediate zones which are indicated as B, B' in Fig. 2, are designed to provide a vertical light spread of the order of 10 degrees.

Superimposed on each of the horizontal primary flutes 16–23, other than those portions of flutes 18, 19 and 20, 21 at the opposite sides of the lens (i. e., the areas of the lens designated D in Fig. 2), are a series of vertically extending secondary flutes 24, 25 and 26 for horizontally spreading the light rays passing therethrough. These vertical flutes 24, 25 and 26 may be either of concave or convex shape, preferably of concave shape as shown, and are of relatively small size having, in the particular case shown, a horizontal width of around ¼ inch or so and being curved to a radius of the order of from 3/16 inch to ½ inch or thereabouts. Of these secondary flutes, the ones (i. e., flutes 24) which are in those areas A and A' of the lens composed of the two uppermost and two lowermost primary flutes 16, 17 and 22, 23 and the portions of the intermediate primary flutes 18 and 21 immediately inward of or adjacent the side areas D of the lens, have the widest spread of all, for example, around 40 degrees in the particular case shown. These flutes 24 spread the light rays passing through the sections A and A' horizontally across substantially the full width of the light beam projected by the lamp. The secondary flutes 25 within the areas B and B' of the lens composed of the central regions of the upper and lower intermediate primary flutes 18 and 21 have a horizontal spread slightly less than that of the flutes 24, for example around 36 degrees in the particular case illustrated, while the secondary flutes 26 in the central area C of the lens, composed of those portions of the central primary flutes 19 and 20 other than the side areas D thereof, have a horizontal spread somewhat less than the flutes 25, for example, around 28 degrees in the particular case illustrated. The flutes 25 and 26, like flutes 24, spread the light rays passing therethrough across approximately the full width of the light beam.

The images of the filament segments 7 which are projected through the portions D of the lens all extend more or less horizontally, i. e., they are not tilted or inclined like those images from other portions of the lens. The sum effect, therefore, of the projected filament segment images from each of the portions of the reflector 3 opposite the side areas D of the lens is to form a block or rectangle of light at the center of the beam which is just about the right configuration and orientation to be particularly suitable for the building up and heightening of the opposite side extremities of the beam so as to produce a true rectangular-shaped beam pattern. For the purposes of the invention, therefore, the side areas D of the lens are provided with relatively small vertical extending left and right bending prisms 27, superimposed on the portions of the horizontal primary flutes 18, 19, 20 and 21 within such lens areas D, for refracting the light rays passing through such lens areas D approximately one-half to each side extremity of the beam projected by the device. The refractive powers of the right and left bending prisms 27 are of course dependent upon the particular horizontal spread which is desired for the resultant light beam. In the particular case illustrated for the projection of a light beam having a total horizontal spread of, for instance, around 30 degrees, the prisms 27 are formed with refractive powers of the order of 14 degrees to the left and 14 degrees to the right.

According to the preferred form of the invention, the prisms 27 are of symmetrical V-shape cross-section, as shown in Figs. 1 and 4, so as to constitute, in effect, combination left and right bending prisms which act to refract the light rays passing therethrough both to the left and to the right. Prisms 27 of such V-shaped character, and having the above-specified particular degree of refraction (i. e., 14 degrees to the left and 14 degrees to the right) will refract approximately 50% of the light rays passing through each lens area D approximately 14 degrees to the left and the other 50% of such light rays approximately 14 degrees to the right. Thus, one-half of the total light passing through each lens section D will be refracted to the left by such prisms 27 so as to be located just inside the left side boundary of the beam (such boundary being at 15° to the left of center of the beam) while the other half of the total light passing through each lens section D will be refracted to the right so as to be located just inside the right side boundary of the beam.

In order to smooth out the filament images and therefore the light beams projected from the side portions D of the lens, the faces of the prisms 27 are formed with vertically extending flutes 28, as shown in Fig. 4, for horizontally spreading the light rays passing therethrough. These flutes 28 need only be of relatively small horizontal light spread, for instance of the order of 2°.

Figure 6:
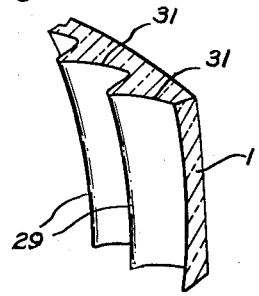
Fig. 6 is a view similar to Fig. 4 of the modification shown in Fig. 5.

Instead of providing the areas D of the lens with V-shaped combination right and left bending prisms 27 such as shown in Figs. 1 and 4 whereby half the light passing through each lens area D is refracted to the left side and the other half to the right side of the beam, one of the said areas D at one side of the lens may be provided with left bending prisms and the other of said areas D at the opposite side of the lens provided with right bending prisms. For example, as shown in Figs. 5 and 6, the area D at the left side of the lens may be provided with left bending prisms 29 having a refractive power of approximately 14 degrees to the left, while the area D at the right side of the lens is provided with right bending prisms 30 having a refractive power of approximately 14 degrees to the right. As in the case of the prisms 27, the faces of the left and right bending prisms 29 and 30 are also preferably formed with vertically extending flutes 31 of relatively small horizontal light spread (for instance around 2° or so) for horizontally spreading the light rays passing through the prisms 29, 30 so as to smooth out the light beam components emanating from the side portions D of the lens.

A light projection device according to the invention having a lens of the particular construction described will project a smooth relatively high intensity light beam of the particular form specified hereinbefore, i. e., one having a horizontally extending rectangular beam pattern which is of substantially uniform intensity throughout all portions of the beam pattern, with no apparent hot spots at the center thereof, and which has a sharp cut-off or drop in light intensity at the boundaries of the rectangle.

Changes may be made in the design of the lens without departing from the spirit of the invention, such as by placing the various flutes and prisms on the exterior or outer surface of the lens instead of on the interior surface as shown, or by providing the horizontal primary flutes on one side of the lens and the vertical secondary flutes and prisms on the other side thereof. Also, the light-directing effect may be derived from a configurated reflecting surface 5 instead of from a lens.

What we claim as new and desire to secure by Letters Patent of the United States is:

1. A light-projection device comprising a concave reflector member of approximately paraboloidal shape, a light-transmitting cover glass member covering the open mouth of said reflector member, and a concentrated light source mounted approximately at the focus of said reflector member and comprising a coiled monoplane filament having three side-by-side segments disposed closely adjacent one another in a horizontal plane and extending in the general direction of the reflector axis with the central segment thereof approximately centered at the focus of said reflector member, one of said members being divided into a series of horizontally extending primary flutes of relatively large size for vertically spreading the light rays passing therethrough, the portions of said one member other than at the opposite sides thereof being provided with a series of relatively small vertically extending secondary flutes superimposed on said horizontal primary flutes, said secondary flutes being of relatively wide horizontal light spread and substantially all of the secondary flutes within the central zone of said one member intermediate the top and bottom zones thereof being of a lesser horizontal light spread than the others of said secondary flutes, and the said side portions of the said one member being provided with a series of relatively small vertically extending prisms superimposed on said horizontal flutes and of a refractive power to direct the light rays passing therethrough into the opposite side extremities of the beam component produced by the said portions of the said one member other than the said side portions thereof.

2. A light projection device substantially as set forth in claim 1 wherein the faces of said prisms are provided with vertically extending flutes of relatively narrow horizontal light spread.

3. A light projection device comprising a concave reflector of approximately paraboloidal shape, a lens covering the open mouth of said reflector, and a concentrated light source mounted approximately at the focus of said reflector and comprising a coiled monoplane filament having three side-by-side segments disposed closely adjacent one another in a horizontal plane and extending in the general direction of the reflector axis with the central segment thereof approximately centered at the focus of said reflector, said lens being divided into a series of horizontally extending primary flutes of relatively large size for vertically spreading the light rays passing therethrough, the portions of said lens other than at the opposite sides thereof being provided with a series of relatively small vertically extending secondary flutes superimposed on said horizontal primary flutes, said secondary flutes being of relatively wide horizontal light spread and substantially all of the secondary flutes within the central zone of said lens intermediate the top and bottom zones thereof being of a lesser horizontal light spread than the others of said secondary flutes, and the said side portions of the said lens being provided with a series of relatively small vertically extending prisms superimposed on said horizontal flutes and of a refractive power to direct the light rays passing through the said side portions of the said lens into the opposite side extremities of the beam component produced by the said portions of said lens other than the said side portions thereof.

4. A light projection device substantially as set forth in claim 3 wherein the said prisms are of approximately symmetrical V-shape section so as to refract approximately one-half of the light passing through each of said side portions of the lens to the opposite side extremities of the beam projected by the device.

5. A light projection device substantially as set forth in claim 3 wherein the said prisms in one of the said side portions of the lens refract the light rays passing therethrough to one side extremity of the beam projected by the device and the said prisms in the other one of said lens side portions refract the light rays passing therethrough to the other side extremity of said beam.

6. A lens for light projection devices, said lens being divided into a series of horizontally extending primary flutes of relatively large size for vertically spreading the light rays passing therethrough, the portions of said lens other than at the opposite sides thereof being provided with a series of relatively small vertically extending secondary flutes superimposed on said horizontal primary flutes, said secondary flutes being of relatively wide horizontal light spread and substantially all of the secondary flutes within the central zone of said lens intermediate the top and bottom zones thereof being of a lesser horizontal light spread than the others of said secondary flutes, and the said side portions of the said lens being provided with a series of relatively small vertically extending prisms superimposed on said horizontal flutes and of a refractive power to direct the light rays passing through the said side portions of the said lens into the opposite side extremities of the beam component produced by the said portions of said lens other than the said side portions thereof.

7. A lens substantially as set forth in claim 6 wherein the said prisms are provided with vertically extending flutes of relatively narrow horizontal light spread.

8. A lens for light projection devices, said lens being divided into a series of horizontally extending primary flutes extending across the width of the lens for vertically spreading the light rays passing therethrough, said primary flutes dividing the lens into top and bottom sections, upper and lower intermediate sections, and a center section, the primary flutes in the central portion of said intermediate sections having a vertical light spread of the order of 10 degrees and the primary flutes in the remainder of said intermediate sections and in the said top, bottom and center sections having a vertical light spread of the order of 15 degrees, the top and bottom sections of said lens and the portions of the said intermediate and center sections other than at the opposite sides of the lens being provided with a series of relatively small vertically extending secondary flutes superimposed on said horizontal primary flutes, the secondary flutes in the center sections, the central portions of the intermediate sections, and the top and bottom sections and remaining portions of the intermediate sections other than at the opposite sides of the lens, having horizontal light spreads of the order of 28 degrees, 36 degrees and 40 degrees, respectively, and each of the said side portions of the lens being provided with a series of relatively small vertically extending and approximately symmetrical V-shaped prisms superimposed on the horizontal flutes within said lens side portions for refracting approximately one-half of the light rays passing through each of said side portions of the lens horizontally to the left an amount of the order of 14 degrees and refracting the other half of the said light rays horizontally to the right an amount of the order of 14 degrees, the faces of said prisms being provided with vertically extending flutes having a horizontal light spread of the order of 2°.

9. A light projection device comprising a concave reflector of approximately paraboloidal shape, a lens covering the open mouth of said reflector, and a concentrated light source mounted approximately at the focus of said reflector and comprising a coiled monoplane filament having three side-by-side segments disposed in a horizontal plane and extending in the general direction of the reflector axis with the central segment thereof approximately centered at the focus of said reflector, said lens being divided into a series of horizontally extending primary flutes having a vertical light spread of the order of from 10 to 15 degrees for vertically spreading the light rays passing therethrough, the portions of said lens other than at the opposite sides thereof being provided with a series of relatively small vertically extending secondary flutes superimposed on said horizontal primary flutes, said secondary flutes having horizontal light spreads ranging from approximately 28 degrees to approximately 40 degrees and the secondary flutes within the central zone of said lens intermediate the top and bottom zones thereof being of a lesser horizontal light spread than the others of said secondary flutes, and each of the said side portions of the said lens being provided with a series of relatively small vertically extending and approximately symmetrical V-shaped prisms superimposed on the horizontal flutes within said lens side portions for refracting approximately one-half of the light rays passing through each of said side portions of the lens horizontally to the left an amount of the order of 14 degrees and refracting the other half of the said light rays horizontally to the right an amount of the order of 14 degrees.

10. A light projection device comprising a concave reflector of approximately paraboloidal shape, a lens covering the open mouth of said reflector, and a concentrated light source mounted approximately at the focus of said reflector and comprising a coiled monoplane filament having three side-by-side segments disposed in a horizontal plane and extending in the general direction of the reflector axis with the central segment thereof approximately centered at the focus of said reflector, said lens being divided into a series of horizontally extending primary flutes extending across the width of the lens for vertically spreading the light rays passing therethrough, said primary flutes dividing the lens into top and bottom sections, upper and lower intermediate sections, and a center section, the primary flutes in the central portion of said intermediate sections having a vertical light spread of the order of 10 degrees and the primary flutes in the remainder of said intermediate sections and in the said top, bottom and center sections having a vertical light spread of the order of 15 degrees, the top and bottom sections of said lens and the portions of the said intermediate and center sections other than at the opposite sides of the lens being provided with a series of relatively small vertically extending secondary flutes superimposed on said horizontal primary flutes, the secondary flutes in the center sections, the central portions of the intermediate sections, and the top and bottom sections and remaining portions of the intermediate sections other than at the opposite sides of the lens, having horizontal light spreads of the order of 28 degrees, 36 degrees and 40 degrees, respectively, and each of the said side portions of the lens being provided with a series of relatively small vertically extending and approximately symmetrical V-shaped prisms superimposed on the horizontal flutes within said lens side portions for refracting approximately one-half of the light rays passing through each of said side portions of the lens horizontally to the left an amount of the order of 14 degrees and refracting the other half of the said light rays horizontally to the right an amount of the order of 14 degrees, the faces of said prisms being provided with vertically extending flutes having a horizontal light spread of the order of 2 degrees.

11. A lens for light projection devices, said lens being divided into a series of horizontally extending primary flutes having a vertical light spread of the order of from 10 to 15 degrees for vertically spreading the light rays passing therethrough, the portions of said lens other than at the opposite sides thereof being provided with a series of relatively small vertically extending secondary flutes superimposed on said horizontal primary flutes, said secondary flutes having horizontal light spreads ranging from approximately 28 degrees to approximately 40 degrees and the secondary flutes within the central zone of said lens intermediate the top and bottom zones thereof being of a lesser horizontal light spread than the others of said secondary flutes, and each of the said side portions of the lens being provided with a series of relatively small vertically extending and approximately symmetrical V-shaped prisms superimposed on the horizontal flutes within said lens side portions for refracting approximately one-half of the light rays passing through each of said side portions of the lens horizontally to the left an amount of the order of 14 degrees and refracting the other half of the said light rays horizontally to the right an amount of the order of 14 degrees.

References Cited in the file of this patent

UNITED STATES PATENTS

| | | |
|---|---|---|
| 1,271,931 | Ogden | July 9, 1918 |
| 1,534,849 | Halvorson | Apr. 21, 1925 |
| 2,137,055 | Koubek | Nov. 15, 1938 |
| 2,568,494 | Geissbuhler | Sept. 18, 1951 |